US011135552B2

(12) United States Patent
Lee et al.

(10) Patent No.: US 11,135,552 B2
(45) Date of Patent: Oct. 5, 2021

(54) HYBRID POLYMERIC HOLLOW FIBER MEMBRANE, HYBRID CARBON MOLECULAR SIEVE HOLLOW FIBER MEMBRANE, AND PROCESSES FOR PREPARING THE SAME

(71) Applicant: Sogang University Research & Business Development Foundation, Seoul (KR)

(72) Inventors: Jong Suk Lee, Seoul (KR); Ju Ho Shin, Seoul (KR); Heseong An, Sheongju-si (KR); Hyun Jung Yu, Gyeonggi-do (KR)

(73) Assignee: Sogang University Research & Business Development Foundation, Seoul (KR)

( * ) Notice: Subject to any disclaimer, the term of this patent is extended or adjusted under 35 U.S.C. 154(b) by 65 days.

(21) Appl. No.: 16/216,463

(22) Filed: Dec. 11, 2018

(65) Prior Publication Data
US 2019/0176090 A1    Jun. 13, 2019

(30) Foreign Application Priority Data

Dec. 12, 2017   (KR) .................. 10-2017-0170364
Oct. 8, 2018    (KR) .................. 10-2018-0119503

(51) Int. Cl.
*B01D 63/02*   (2006.01)
*B01D 71/02*   (2006.01)
(Continued)

(52) U.S. Cl.
CPC ....... *B01D 63/021* (2013.01); *B01D 67/0067* (2013.01); *B01D 69/02* (2013.01);
(Continued)

(58) Field of Classification Search
None
See application file for complete search history.

(56) References Cited

U.S. PATENT DOCUMENTS 9,901,880 B2    2/2018   Lee et al.
2008/0290020 A1*  11/2008  Marand .................. B01D 69/12
                                                        210/500.27
(Continued)

FOREIGN PATENT DOCUMENTS

KR   10-2015-0001369 A   1/2016
KR   10-2016-0103810 A   9/2016
(Continued)

OTHER PUBLICATIONS

Xu, L. et al. "Matrimid® derived carbon molecular sieve hollow fiber membranes for ethylene/ethane separation" Journal of Membrane Science, vol. 380, 2011, pp. 138-147.
(Continued)

*Primary Examiner* — Jason M Greene
(74) *Attorney, Agent, or Firm* — Oblon, McClelland, Maier & Neustadt, L.L.P.

(57) ABSTRACT

The present invention relates to a polymeric hollow fiber membrane and a carbon molecular sieve hollow fiber membrane, both of which have excellent gas separation performance, and processes for preparing the same. Specifically, the present invention relates to a hybrid polymeric hollow fiber membrane that comprises a glassy polymer containing fluorine and a ladder-structured polysilsesquioxane, a hybrid carbon molecular sieve hollow fiber membrane prepared by pyrolysis thereof, and processes for preparing the same. The hybrid polymeric hollow fiber membrane and the hybrid carbon molecular sieve hollow fiber membrane according to the embodiments of the present invention are excellent in gas flux and selectivity and can have a large surface area per
(Continued)

unit volume. Thus, they can be advantageously used for separating gases with a high energy efficiency on a large scale.

23 Claims, 3 Drawing Sheets

(51) Int. Cl.
    *B01D 69/08*     (2006.01)
    *B01D 69/02*     (2006.01)
    *B01D 69/14*     (2006.01)
    *B01D 67/00*     (2006.01)
    *B01D 71/32*     (2006.01)
    *B01D 71/70*     (2006.01)
    *B01D 53/22*     (2006.01)

(52) U.S. Cl.
    CPC ......... *B01D 69/085* (2013.01); *B01D 69/148* (2013.01); *B01D 71/021* (2013.01); *B01D 71/028* (2013.01); *B01D 53/228* (2013.01); *B01D 67/0011* (2013.01); *B01D 67/0079* (2013.01); *B01D 67/0088* (2013.01); *B01D 69/08* (2013.01); *B01D 71/32* (2013.01); *B01D 71/70* (2013.01); *B01D 2256/245* (2013.01); *B01D 2257/102* (2013.01); *B01D 2257/104* (2013.01); *B01D 2257/504* (2013.01); *B01D 2323/42* (2013.01); *B01D 2325/02* (2013.01); *B01D 2325/023* (2013.01)

(56) References Cited

U.S. PATENT DOCUMENTS

| | | | |
|---|---|---|---|
| 2015/0033945 A1* | 2/2015 | Yamada | B01D 71/70 96/14 |
| 2016/0107127 A1* | 4/2016 | Lee | B01D 53/228 96/4 |
| 2016/0184775 A1* | 6/2016 | Chevrel | B01D 53/228 95/45 |
| 2016/0199791 A1* | 7/2016 | Benes | B01D 53/228 95/51 |
| 2017/0120200 A1* | 5/2017 | Lee | B01D 71/021 |

FOREIGN PATENT DOCUMENTS

KR     10-2017-0051156 A     5/2017
WO     WO 2016/137151 A1     9/2016

OTHER PUBLICATIONS

Bhuwania, N. et al. "Engineering substructure morphology of asymmetric carbon molecular sieve hollow fiber membranes" ScienceDirect, Carbon, vol. 76, 2014, pp. 417-434.

Xu, L. et al. "Physical aging in carbon molecular sieve membranes" ScienceDirect, Carbon, vol. 80, 2014, pp. 155-166.

* cited by examiner

HYBRID POLYMERIC HOLLOW FIBER MEMBRANE, HYBRID CARBON MOLECULAR SIEVE HOLLOW FIBER MEMBRANE, AND PROCESSES FOR PREPARING THE SAME

CROSS-REFERENCE TO RELATED APPLICATION

This application claims priority to Korean Patent Application No. 10-2017-1070364, filed on Dec. 12, 2017, and Korean Patent Application No. 10-2018-0119503, filed on Oct. 8, 2018, and all the benefits accruing therefrom under 35 U.S.C. § 119, the contents of which in its entirety are herein incorporated by reference.

BACKGROUND

1. Field

The present invention relates to a polymeric hollow fiber membrane and a carbon molecular sieve hollow fiber membrane, both of which have excellent gas separation performance, and processes for preparing the same. Specifically, the present invention relates to a hybrid polymeric hollow fiber membrane that comprises a glassy polymer containing fluorine and a ladder-structured polysilsesquioxane, a hybrid carbon molecular sieve hollow fiber membrane prepared by pyrolysis thereof, and processes for preparing the same.

DESCRIPTION ABOUT NATIONAL SUPPORT RESEARCH AND DEVELOPMENT

This study was supported by the National Research Foundation of Korea (NRF) grant funded by the Korea government (MSIP) (No. 2017R1A2B4007987). Also, it was partly supported by the "Next Generation Carbon Upcycling Project" (Project No. 2018M1A2A60755919).

2. Description of the Related Art

In the petrochemical industry, ethylene/ethane and propylene/propane are very important compounds and form a significantly large market all over the world. In general, the separation of such an olefin/paraffin system has been carried out by cryogenic distillation. However, the cryogenic distillation undesirably consumes a large amount of energy. Thus, several attempts have been made to replace it with an energy-efficient alternative including the membrane technology.

In addition, studies have been actively conducted to remove carbon dioxide ($CO_2$) contained in the natural gas to a certain level (for example, 2%) or less using a membrane technology. In the case of gas separation involving a condensable gas, however, the conventional polymeric separation membranes have a problem that the selectivity of gas separation is remarkably reduced by plasticization of the polymer chains under high-pressure conditions.

A carbon molecular sieve (CMS) has attracted attention as a separation membrane that is excellent in performance for separating gas molecules that are hardly separable or expensive for separation thereof by the conventional technology as described above.

When a carbon molecular sieve membrane is fabricated through pyrolysis of a polymeric membrane precursor, the $sp^2$ hybrid carbon sheets produced at the time of pyrolysis form a structure in which they are misaligned with each other (i.e., a turbostratic structure). In such event, due to the packing defects present between the carbon sheets, highly permeable micropores (i.e., 7 to 20 Å) and highly selective ultramicropores (i.e., <7 Å) can be formed together. Thus, a carbon molecular sieve membrane may have an excellent gas permeability and selectivity as compared with a polymeric membrane precursor.

In general, a hollow fiber configuration leads to a larger surface area per unit volume than that of a flat counterpart. Thus, a hollow fiber membrane typically fabricated through a dry-jet/wet-quench process is more preferable than the flat membrane for the purpose of gas separation on a large scale (see FIG. 1). Specifically, a polymer solution (or dope solution) and a bore fluid such as an aqueous solution of N-methyl-2-pyrrolidone (NMP) are coextruded (i.e., spun) through a spinneret into the air gap. During exposure to air, the highly volatile solvent is evaporated, resulting in the formation of a dense layer near the outer wall of the hollow fiber membrane. Subsequently, when the hollow fiber membrane is quenched in water, a phase separation takes place by the exchange of water and the solvent, resulting in the formation of a porous support layer (FIG. 2). The conditions for the process for fabricating a polymeric hollow fiber membrane may include polymer solution temperature, polymer solution extrusion rate, winding speed, air exposure height, water temperature, and the like.

Thereafter, the polymeric hollow fiber membrane precursor obtained in the dry-jet/wet-quench process is pyrolyzed (i.e., carbonized) in a pyrolysis apparatus to prepare a carbon molecular sieve hollow fiber membrane. For example, the temperature of a quartz tube that contains a polymeric hollow fiber membrane is raised to a level at which pyrolysis can be carried out while an inert gas such as argon is continuously fed thereinto. In such event, since a glassy polymer generally has a degradation temperature higher than the glass transition temperature thereof, the polymer chains are relaxed at the temperature higher than the glass transition temperature thereof during the pyrolysis of the polymeric hollow fiber membrane, which damages the pores in the support layer and forms a thick resistive layer. Due to the formation of such a thick resistive layer, it is difficult that conventional carbon molecular sieve hollow fiber membranes have excellent flux albeit the corresponding carbon molecular sieve dense membranes show high permeability (see J. Membr. Sci., 2011, 380, 138-147).

In order to solve this problem, the surface of a polymeric hollow fiber membrane is treated with vinyltrimethoxysilane ("V-treatment") before the pyrolysis of the polymeric hollow fiber membrane, followed by a hydrolysis-condensation reaction to form a crosslinked silica layer. It is possible to prevent the collapse of the internal structure of the carbon molecular sieve hollow fiber membrane by virtue of the rigid siloxane structure thus formed (see Carbon, 2014, 76, 417-434 and U.S. Patent Publication No. 2013-0152793). However, the V-treatment method still has disadvantages in that it requires a number of additional steps and that the crosslinked silica layer unnecessarily formed on the surface generates resistance, thereby reducing the gas permeation efficiency.

Meanwhile, in order to solve the collapse of the internal structure of a carbon molecular sieve hollow fiber membrane, a multilayer carbon molecular sieve hollow fiber membrane has been recently proposed, which contains nanoparticles such as silica ($SiO_2$), polyhedral oligomeric silsesquioxane (POSS), or the like (see U.S. Patent Publication No. 2017-0274327). Silica and POSS, which have high thermal stability, not only support the pores in the hollow fiber membrane, thereby preventing the collapse of the pores during the pyrolysis process, but also prevent the deterioration in the permeability. However, this solution based on the particulate material has a limitation in efficiently maintaining the pores in the support layer of a hollow fiber membrane due to the agglomeration phenomenon that occurs as the content of the particles increases.

In addition, a carbon molecular sieve membrane has a problem that the gas permeability is drastically decreased with time due to the physical aging phenomenon. The structure of a carbon molecular sieve hollow fiber membrane formed immediately after pyrolysis (i.e., carbonization) of a polymeric hollow fiber membrane is thermodynamically unstable. Thus, the packing of carbon sheets is tightened in order to reach an equilibrium state, possibly decreasing the pore volume. In particular, a carbon molecular sieve hollow fiber membrane based on a glassy polymeric hollow fiber membrane precursor having a large free volume shows a drastic decrease in the flux (see Carbon, 2014, 80, 155-166).

REFERENCE OF THE RELATED ART

Patent Documents (Patent Document 1) U.S. Patent Publication No. 2013-0152793
(Patent Document 2) U.S. Patent Publication No. 2017-0274327

Non-Patent Documents (Non-patent Document 1) J. Membr. Sci., 2011, 380, 138-147
(Non-patent Document 2) Carbon, 2014, 76, 417-434
(Non-patent Document 3) Carbon, 2014, 80, 155-166

SUMMARY

Technical Problem to be Solved

An object of the present invention is to provide a polymeric hollow fiber membrane that is excellent in gas permeability and selectivity.

Another object of the present invention is to provide a process for preparing the polymeric hollow fiber membrane.

Still another object of the present invention is to provide a carbon molecular sieve hollow fiber membrane that is prepared by pyrolysis (i.e., carbonization) of the polymeric hollow fiber membrane and is excellent in gas permeability and selectivity.

Still another object of the present invention is to provide a process for preparing the carbon molecular sieve hollow fiber membrane.

Solution to the Problem

According to an embodiment of the present invention to achieve the object, there is provided a hybrid polymeric hollow fiber membrane, which comprises a glassy polymer matrix containing fluorine and a ladder-structured polysilsesquioxane.

According to an embodiment of the present invention to achieve another object, there is provided a process for preparing a hybrid polymeric hollow fiber membrane, which comprises (1) dissolving a glassy polymer containing fluorine and a ladder-structured polysilsesquioxane in an organic solvent to obtain a polymer solution; (2) extruding the polymer solution and a bore fluid through a spinneret to form a polymeric hollow fiber membrane; (3) quenching the extruded polymeric hollow fiber membrane in a quenching medium; and (4) winding the polymeric hollow fiber membrane.

According to an embodiment of the present invention to achieve still another object, there is provided a hybrid carbon molecular sieve hollow fiber membrane, which comprises a carbonized product of a hybrid polymeric hollow fiber membrane, which comprises a glassy polymer matrix containing fluorine and a ladder-structured polysilsesquioxane.

According to an embodiment of the present invention to achieve still another object, there is provided a process for preparing a hybrid carbon molecular sieve hollow fiber membrane, which comprises (1) dissolving a glassy polymer containing fluorine and a ladder-structured polysilsesquioxane in an organic solvent to obtain a polymer solution; (2) extruding the polymer solution and a bore fluid through a spinneret to form a polymeric hollow fiber membrane; (3) quenching the extruded polymeric hollow fiber membrane in a quenching medium; (4) winding the polymeric hollow fiber membrane; and (5) pyrolyzing the polymeric hollow fiber membrane.

Advantages Effects of the Invention

In the hybrid polymeric hollow fiber membrane according to an embodiment of the present invention, which comprises a glassy polymer matrix containing fluorine and a ladder-structured polysilsesquioxane, the polysilsesquioxane having a rigid double siloxane structure in a ladder shape produces the effects of antiplasticization and antiaging.

In addition, in the hybrid carbon molecular sieve hollow fiber membrane prepared therefrom, the polysilsesquioxane having a rigid double siloxane structure in a ladder shape raises the glass transition temperature of the glassy polymer, which minimizes the phenomenon that the porous support layer collapses at the time of pyrolysis. Through the above, it is possible to achieve excellent gas separation performance inherent to a carbon molecular sieve (for example, in terms of gas permeability and selectivity), particularly a high flux. Since a polysilsesquioxane contains an organic functional group, it is well mixed with a glassy polymer. The rigid double siloxane structure thereof can retard the aging phenomenon of the hybrid carbon molecular sieve hollow fiber membrane like the hybrid polymeric hollow fiber membrane. In addition, it is advantageous in that no additional resistive layer is formed near the outer wall of the carbon molecular sieve hollow fiber membrane.

The hybrid polymeric hollow fiber membrane and the hybrid carbon molecular sieve hollow fiber membrane of the present invention can be fabricated by a simple process.

DETAILED DESCRIPTION

Figure 1:
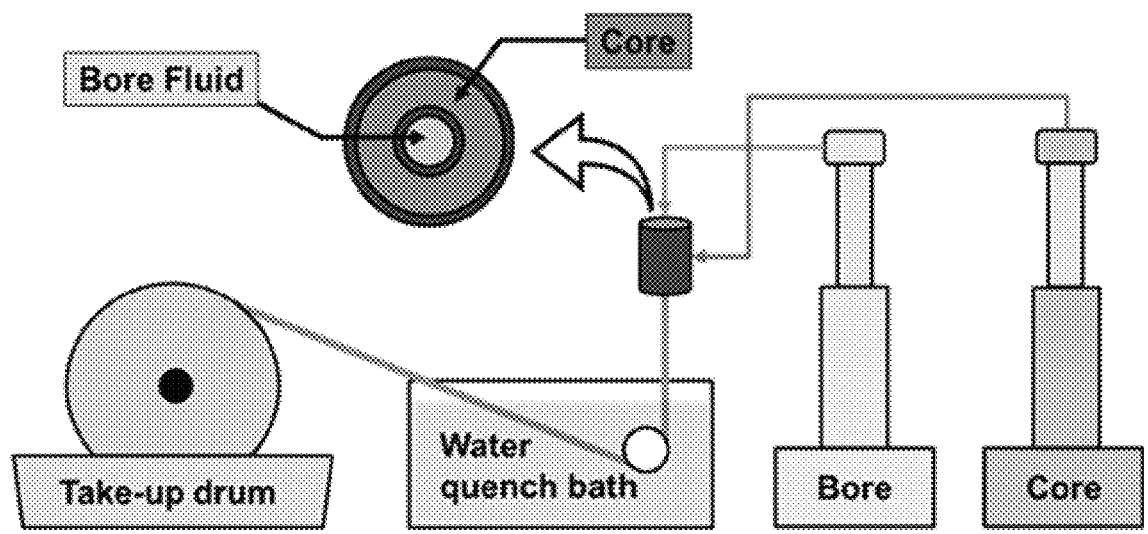
FIG. 1 is a schematic diagram of a dry-jet/wet-quench process for fabricating a polymeric hollow fiber membrane.
Figure 2:
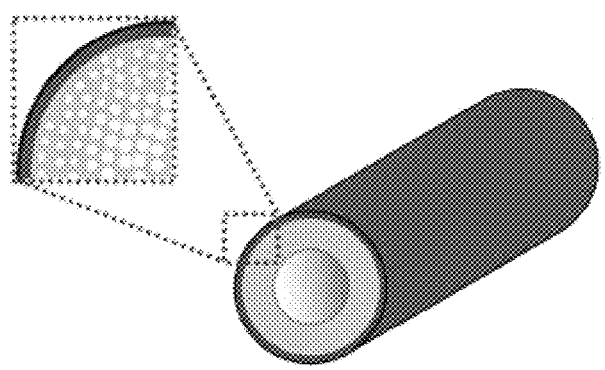
FIG. 2 is a schematic diagram of a polymeric hollow fiber membrane.

Hereinafter, the present invention will be described in more detail.

Hybrid Polymeric Hollow Fiber Membrane

The hybrid polymeric hollow fiber membrane according to an embodiment of the present invention comprises a glassy polymer matrix containing fluorine and a ladder-structured polysilsesquioxane (LPSQ).

The hybrid polymeric hollow fiber membrane may be prepared from a composition that comprises a glassy polymer containing fluorine and a ladder-structured polysilsesquioxane (LPSQ).

Specifically, the fluorine-containing glassy polymer, which is one component of the hybrid polymeric hollow fiber membrane according to an embodiment of the present invention, may be a polyimide that contains fluorine.

As an example, the polyimide that contains fluorine in the molecule may be obtained by a known condensation reaction of an aromatic carboxylic dianhydride and an aromatic diamine.

As a preferred example, the polyimide that contains fluorine in the molecule may be a fluorine-containing polyimide obtained by a condensation reaction of an aromatic carboxylic dianhydride and an aromatic diamine.

The aromatic carboxylic dianhydride that can be used in the synthesis of the fluorine-containing polyimide of the present invention may be at least one selected from the group consisting of pyromellitic dianhydride, 4,4'-diphthalic anhydride, 4,4'-carbonyldiphthalic anhydride, 4,4'-(hexafluoroisopropylidene)diphthalic anhydride (6FDA), 4,4'-oxydiphthalic anhydride, 4,4'-sulfonyldiphthalic anhydride, and 4,4'-(4,4'-isopropylidene-diphenoxy)diphthalic anhydride. But the aromatic carboxylic dianhydride that can be used in the synthesis of the fluorine-containing polyimide is not limited thereto.

Preferably, the aromatic carboxylic dianhydride that can be used in the synthesis of the fluorine-containing polyimide may be 4,4'-(hexafluoroisopropylidene)diphthalic anhydride (6FDA) represented by the following Formula 1.

[Formula 1]

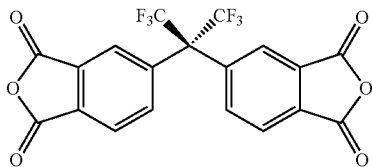

The aromatic diamine that can be used in the synthesis of the fluorine-containing polyimide of the present invention may be at least one selected from the group consisting of 2,4,6-trimethyl-1,3-diaminobenzene (DAM), 3,5-diaminobenzoic acid (DABA), 1,4-phenylenediamine (p-PDA), 1,3-phenylenediamine (m-PDA), 2,3,5,6-tetramethyl-1,4-phenylenediamine (Durene), 2,4,5,6-tetrafluoro-1,3-phenylenediamine, 2,3,5,6-tetrafluoro-1,4-phenylenediamine, and 3,5-diaminobenzoic acid. But the aromatic diamine that can be used in the synthesis of the fluorine-containing polyimide is not limited thereto.

Preferably, the aromatic diamine that can be used in the synthesis of the fluorine-containing polyimide may be selected from the group consisting of 2,4,6-trimethyl-1,3-diaminobenzene (DAM) represented by the following Formula 2(a), 3,5-diaminobenzoic acid (DABA) represented by the following Formula 2(b), 1,4-phenylenediamine (p-PDA) represented by the following Formula 2(c), 1,3-phenylenediamine (m-PDA) represented by the following Formula 2(d), and 2,3,5,6-tetramethyl-1,4-phenylenediamine (Durene) represented by the following Formula 2(e).

[Formula 2]

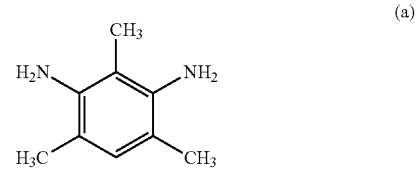

(a)

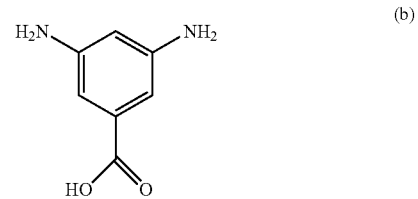

(b)

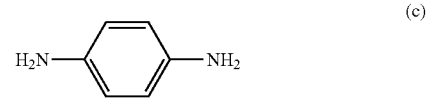

(c)

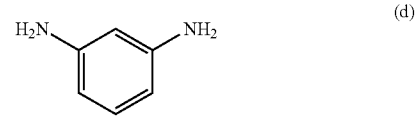

(d)

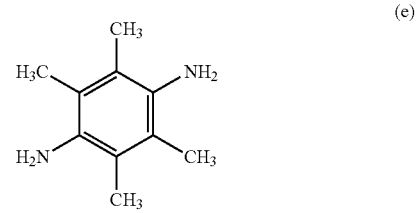

(e)

As a preferred example, the polyimide that contains fluorine in the molecule may be 4,4'-(hexafluoroisopropylidene)diphthalic anhydride (6FDA)-based polyimide having a repeat unit represented by the following Formula 3.

[Formula 3]

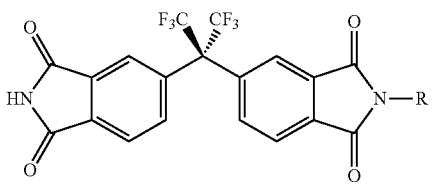

In the above Formula 3, R is a $C_{1-20}$ aliphatic alkyl; an alicyclic alkyl containing a monocyclic ring, a bicyclic ring, a heterocyclic ring, or a multicyclic ring; or a carbon compound containing an aromatic ring, each of which may, or may not, contain fluorine.

Specifically, the 6FDA-based polyimide may be at least one selected from the group consisting of poly(2,4,6-trimethyl-1,3-phenylene-4,4'-(hexafluoroisopropylidene)diphthalimide) (6FDA-DAM), poly(1,3-phenylene-4,4'-hexafluoroisopropylidene)diphthalimide (6FDA-mPDA), poly(3,5-benzoic acid-4,4'-(hexafluoroisopropylidene)diphthalimide (6FDA-DABA), poly(diethyltoluene-4,4'-(hexafluoroisopropylidene)diphthalimide (6FDA-DETDA), poly(2,4,6-trimethyl-1,3-phenylene-(4,4'-(hexafluoroisopropylidene) diphthalimide-co-2,4,6-trimethyl-1,3-phenylene-4,4'-bipthalimide (6FDA:BPDA-DAM (1:1)), poly(1,5-naphthalene-4,4'-(hexafluoroisopropylidene)diphthalimide-co-4,4'-diphenylether-4,4'-(hexafluoroisopropylidene) diphthalimide (6FDA-1,5-ND:ODA (1:1)), poly (diethyltoluene-4,4'-(hexafluoroisopropylidene) diphthalimide-co-2,4,6-trimethyl -1,3-phenylene-4,4'-(hexafluoroisopropylidene)dipthalimide (6FDA-DETDA: DABA (3:2)), poly(1,3-phenylene-4,4'-(hexafluoroisopropylidene)diphthalimide-co-3,5-benzoic acid-4,4'-(hexafluoroisopropylidene)diphthalimide)) (6FDA-mPDA:DAM (3:2)), poly(2,4,6-trimethyl-1,3-phenylene-4,4'-(hexafluoroisopropylidene)diphthalimide-co-3, 5-benzoic acid-4,4'-(hexafluoroisopropylidene)diphthalimide)) (6FDA-DAM:DABA (3:2)), and poly(1,3-phenylene-4,4'-(hexafluoroisopropylidene)diphthalimide-co-3,5-benzoic acid-4,4'-hexafluoroisopropylidene)diphthalimide) (6FDA-mPDA:DABA (3:2)), but it is not limited thereto. Here, the ratio in parentheses stands for the molar ratio of the components for each polymer.

In a preferred example, the 6FDA-based polyimide may be 6FDA-DAM:DABA (3:2) represented by the following Formula 3a.

membrane according to an embodiment of the present invention, may have a structure represented by the following Formula 4.

[Formula 4]

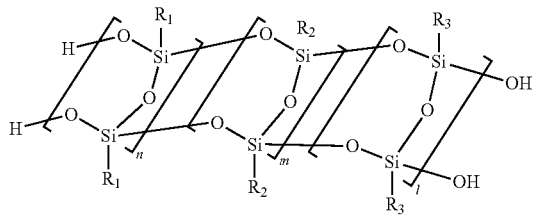

In the above Formula 4, $R_1$, $R_2$, and $R_3$ are each independently an organic functional group selected from the group consisting of aromatic phenyl, heteroaromatic phenyl, aliphatic alkyl, cycloaliphatic alkyl, vinyl, aryl, methacrylate, acrylate, and epoxy, and n, m, and l are each an integer selected from 0 to 100.

The molar ratio of $R_1$:$R_3$ (i.e., n:l) may be 0.1:99.9 to 99.9:0.1, as expressed in terms of the copolymerization ratio of the organic functional groups in the ladder-structured polysilsesquioxane, and m may be 0. In addition, the molar ratio of $R_2$:$R_3$ (i.e., m:l) may be 0.1:99.9 to 99.9:0.1, and n may be 0.

Specifically, the molar ratio of $R_1$:$R_3$ may be 10:90 to 90:10, 20:80 to 80:20, 30:70 to 70:30, 50:50 to 70:30, or 55:45 to 65:35. More specifically, the molar ratio of $R_1$:$R_3$ may be about 6:4. Here, m may be 0. In addition, the molar ratio of $R_2$:$R_3$ may be 10:90 to 90:10, 20:80 to 80:20, 30:70 to 70:30, 50:50 to 70:30, or 55:45 to 65:35. More specifically, the molar ratio of $R_2$:$R_3$ may be about 6:4. Here, n may be 0.

In addition, the molar ratio of $R_1$:$R_2$:$R_3$ (i.e., n:m:l) may preferably be about 3:3:4, 3:4:3, or 4:3:3, but it is not limited thereto.

The polysilsesquioxane may have a number average molecular weight of $10^2$ to $10^8$ g/mole, more specifically $10^3$ to $10^7$ or $10^4$ to $10^6$ g/mole.

For example, the ladder-structured polysilsesquioxane may be selected from the group consisting of ladder-structured poly(phenyl-co-methacryloxypropyl)silsesquioxane, ladder-structured poly(phenyl-co-glycidoxypropyl)silsesquioxane, ladder-structured poly(phenyl-co-pyridylethyl)

[Formula 3a]

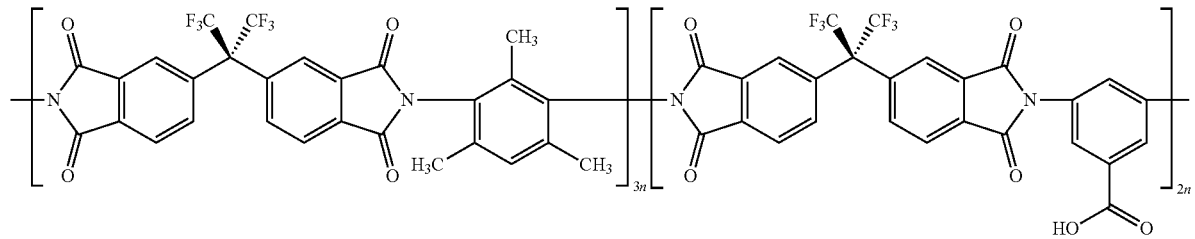

In the above Formula 3a, n is an integer selected from $10^2$ to $10^4$.

The ladder-structured polysilsesquioxane, which is another component of the hybrid polymeric hollow fiber silsesquioxane, ladder-structured poly(cyclohexyl-co-pyridylethyl)silsesquioxane, ladder-structured poly (cyclohexyl-co-phenyl-co-pyridylethyl)silsesquioxane, and a mixture thereof. But the ladder-structured polysilsesquioxane is not limited thereto.

Preferably, the ladder-structured polysilsesquioxane may be at least one selected from the group consisting of ladder-structured poly(phenyl-co-methacryloxypropyl)silsesquioxane (LPMA64) represented by the following Formula 4a wherein $R_1$ and $R_3$ have a molar ratio of 6:4 in Formula 4, ladder-structured poly(phenyl-co-glycidoxypropyl)silsesquioxane (LPG64) represented by the following Formula 4b wherein $R_1$ and $R_3$ have a molar ratio of 6:4 in Formula 4, ladder-structured poly(phenyl-co-pyridylethyl)silsesquioxane (LPPyr64) represented by the following Formula 4c wherein $R_1$ and $R_3$ have a molar ratio of 6:4 in Formula 4, ladder-structured poly(cyclohexyl-co-pyridylethyl)silsesquioxane (LCPyr64) represented by the following Formula 4d wherein $R_1$ and $R_3$ have a molar ratio of 6:4 in Formula 4, ladder-structured poly(cyclohexyl-co-phenyl-co-pyridylethyl)silsesquioxane (LCPPyr334) represented by the following Formula 4e wherein $R_1$, $R_2$, and $R_3$ have a molar ratio of 3:3:4 in Formula 4.

[Formula 4a]

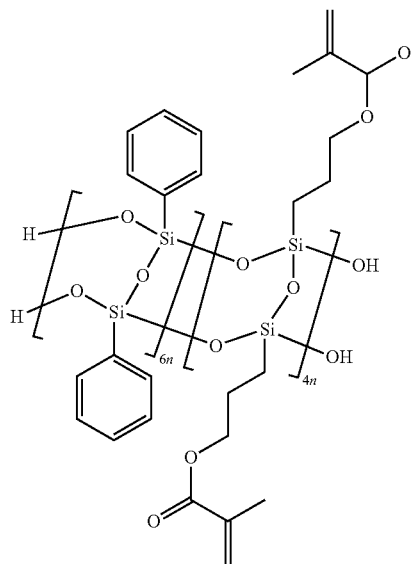

[Formula 4b]

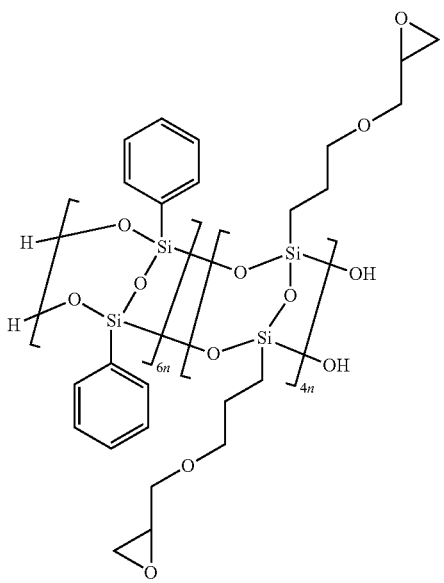

[Formula 4c]

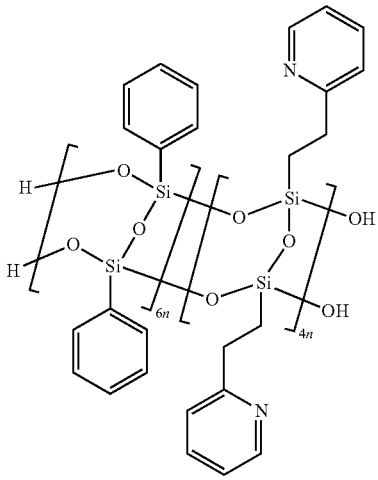

[Formula 4d]

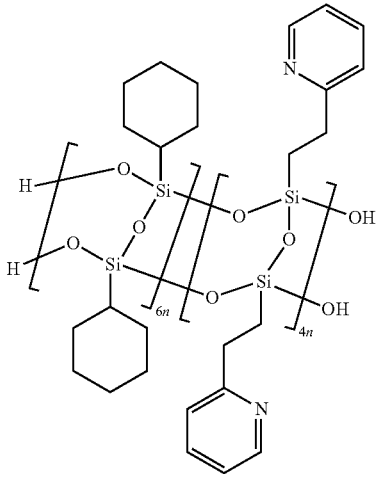

[Formula 4e]

The ladder-structured polysilsesquioxane may be obtained by a known hydrolysis-condensation reaction of a silane monomer. Specifically, the ladder-structured polysilsesquioxane may be obtained by a known hydrolysis-condensation reaction of at least one selected from the group consisting of (a) an aliphatic monomer, (b) an aromatic monomer, and (c) a cross-linkable monomer.

Specifically, the silane monomer may be at least one selected from the group consisting of (propyl)trimethoxysilane, (3-bromopropyl)trimethoxysilane, (acetoxy)methyltrimethoxysilane, (cyclohexyl)trimethoxysilane, (phenyl)trimethoxysilane, ((chloromethyl)phenylethyl)trimethoxysilane, 2-(2-pyridylethyl)trimethoxysilane, (3-glycidoxypropyl)trimethoxysilane, (methacryloxypropyl)trimethoxysilane, and (butenyl)trimethoxysilane. But the silane monomer that can be used in the synthesis of the ladder-structured polysilsesquioxane is not limited thereto.

Preferably, the aliphatic silane monomer that can be used in the synthesis of the ladder-structured polysilsesquioxane may comprise at least one of (propyl)trimethoxysilane, (3-bromopropyl)trimethoxysilane, (acetoxy)methyltrimethoxysilane, and (cyclohexyl)trimethoxysilane as represented by the following Formula 5(a); the aromatic silane monomer may comprise at least one of (phenyl)trimethoxysilane, ((chloromethyl)phenylethyl)trimethoxysilane, and 2-(2-pyridylethyl)trimethoxysilane as represented by the following Formula 5(b); and the cross-linkable silane monomer may comprise at least one of (3-glycidoxypropyl)trimethoxysilane, (methacryloxypropyl)trimethoxysilane, and (butenyl)trimethoxysilane as represented by the following Formula 5(c).

[Formula 5]

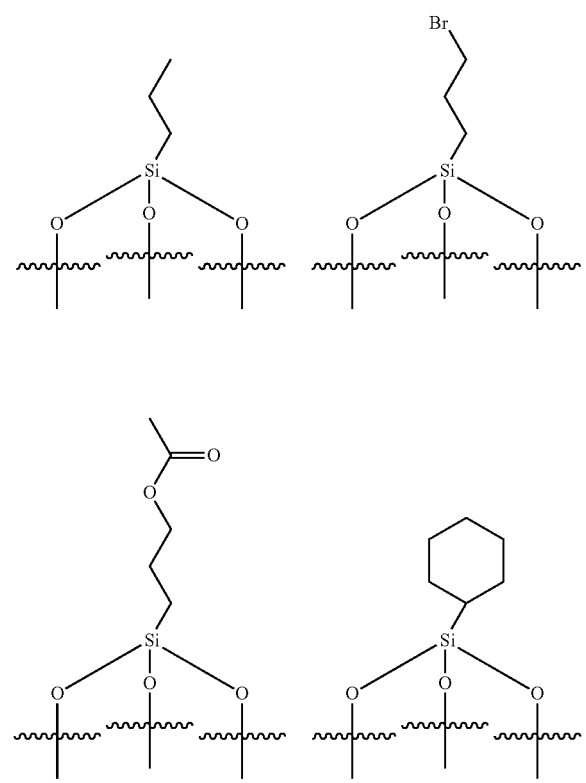

(a)

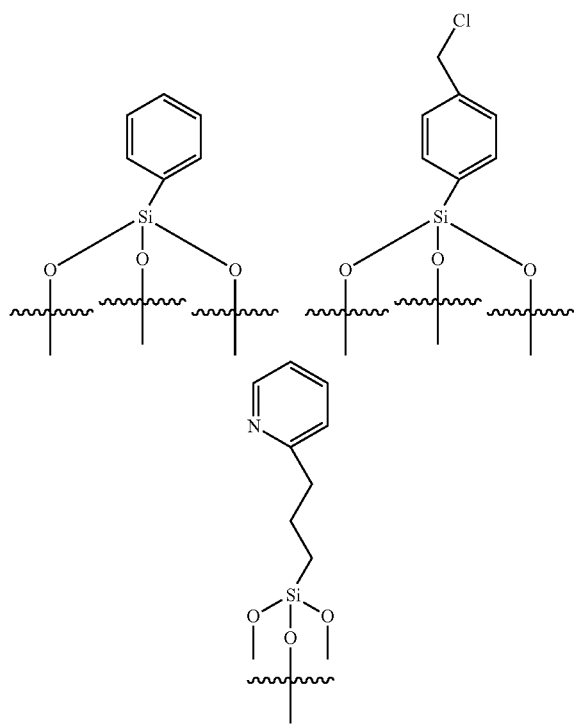

(b)

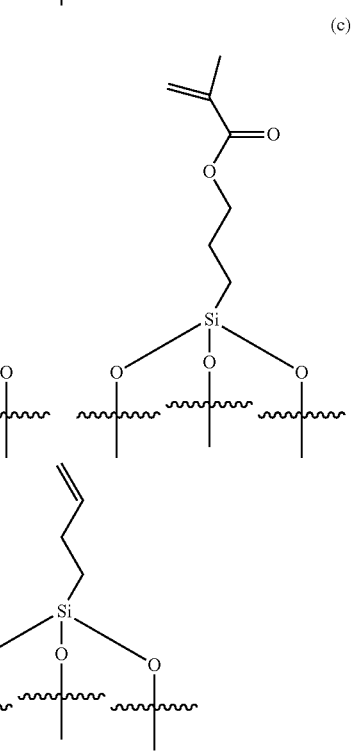

(c)

The hybrid polymeric hollow fiber membrane according to an embodiment of the present invention may comprise, for example, the fluorine-containing glassy polymer and the ladder-structured polysilsesquioxane in a weight ratio of 0.1:99.9 to 99.9:0.1, specifically in a weight ratio of 20:80 to 90:10, more specifically in a weight ratio of 70:30 to 95:5. It is possible to control the gas separation performance of the hybrid polymeric hollow fiber membrane and that of the hybrid carbon molecular sieve hollow fiber membrane prepared therefrom through the mixing ratio of the fluorine-containing glassy polymer to the ladder-structured polysilsesquioxane in the hybrid polymeric hollow fiber membrane according to an embodiment of the present invention.

In general, a polymeric membrane does not contain micropores in the selective layer. But the thermal fluctuation of the polymer chains creates empty spaces, i.e., free volume, between the chains, through which a gas permeates. Conventional polymeric membranes, however, involve the aging phenomenon that decreases the permeability over time and the plasticization phenomenon that reduces the selectivity to condensable gases under high pressures.

In contrast, in the hybrid polymeric hollow fiber membrane according to an embodiment of the present invention, the rigid double siloxane structure of the ladder-structured polysilsesquioxane added to the fluorine-containing polyimide matrix that has a high free volume retards the movement of the polymer chains, thereby reducing the aging phenomenon (i.e., antiaging effect) and reducing the plasticization phenomenon (i.e., antiplasticization effect).

Meanwhile, the hybrid polymeric hollow fiber membrane according to an embodiment of the present invention may have an outer diameter of 200 to 400 μm and an inner diameter of 100 to 200 μm. Preferably, the hybrid polymeric hollow fiber membrane may have an outer diameter of 250 to 350 μm and an inner diameter of 120 to 180 μm.

The hybrid polymeric hollow fiber membrane according to an embodiment of the present invention may be used as a precursor for a hybrid carbon molecular sieve hollow fiber membrane.

Process for Preparing a Hybrid Polymeric Hollow Fiber Membrane

The process for preparing a hybrid polymeric hollow fiber membrane according to another embodiment of the present invention comprises (1) dissolving a glassy polymer containing fluorine and a ladder-structured polysilsesquioxane in an organic solvent to obtain a polymer solution; (2) extruding the polymer solution and a bore fluid through a spinneret to form a polymeric hollow fiber membrane; (3) quenching the extruded polymeric hollow fiber membrane in a quenching medium; and (4) winding the polymeric hollow fiber membrane.

Referring to FIG. 1, the process of preparing a hybrid polymeric hollow fiber membrane according to an embodiment of the present invention will be described.

First, in step (1), a glassy polymer containing fluorine and a ladder-structured polysilsesquioxane are dissolved in an organic solvent to obtain a polymer solution.

Details of the fluorine-containing glassy polymer and the ladder-structured polysilsesquioxane are as described above in connection with the hybrid polymeric hollow fiber membrane.

The organic solvent is not particularly limited as long as it dissolves the fluorine-containing glassy polymer and the ladder-structured polysilsesquioxane, and then is removed. Preferably, the organic solvent may be selected from the group consisting of N-methyl-2-pyrrolidone (NMP), dimethylformamide (DMF), tetrahydrofuran (THF), methylene chloride (MC), dimethyl sulfoxide (DMSO), and a mixture thereof.

The weight ratio of the fluorine-containing glassy polymer to the ladder-structured polysilsesquioxane to be dissolved in the organic solvent may be 0.1:99.9 to 99.9:0.1, specifically 20:80 to 90:10, more specifically 70:30 to 95:5. It is possible to control the gas separation performance of the hybrid polymeric hollow fiber membrane and that of the carbon molecular sieve hollow fiber membrane prepared therefrom by adjusting the weight ratio of the fluorine-containing glassy polymer to the ladder-structured polysilsesquioxane to be dissolved in the organic solvent. For example, as the content of the polysilsesquioxane increases, the permeability of carbon dioxide decreases, while the selectivity of carbon dioxide/methane increases.

The weight ratio of the organic solvent to the total weight of the fluorine-containing glassy polymer and the ladder-structured polysilsesquioxane may be 0.1:99.9 to 40:60. Specifically, the weight of the solid contents of the fluorine-containing polymer and the polysilsesquioxane may be at least 0.1% by weight, at least 1% by weight, at least 5% by weight, at least 10% by weight, at least 15% by weight, at least 20% by weight, at least 25% by weight, at least 30% by weight, at least 35% by weight, or 40% by weight, and at most 40% by weight, at most 35% by weight, at most 30% by weight, at most 25% by weight, at most 20% by weight, at most 15% by weight, at most 10% by weight, at most 5% by weight, at most 1% by weight, or 0.1% by weight, based on the total weight of the fluorine-containing polymer, the polysilsesquioxane, and the organic solvent. More specifically, the solid contents of the fluorine-containing polymer and the polysilsesquioxane may be 0.1 to 40% by weight, 1 to 30% by weight, 5 to 20% by weight, or 7 to 13% by weight, based on the total weight of the fluorine-containing polymer, the polysilsesquioxane, and the organic solvent. If the total weight of the fluorine-containing polymer and the polysilsesquioxane is greater than 40% by weight of the fluorine-containing polymer, the polysilsesquioxane, and the organic solvent, it is difficult to form a polymeric hollow fiber membrane. If it is less than 0.1% by weight, the gas separation performance may be impaired.

Preferably, the polymer solution may comprise a non-solvent. In such event, the non-solvent may be selected from an aliphatic alcohol such as methanol and ethanol, but it is not limited thereto. The non-solvent serves to control the phase separation rate of the polymer solution spun from the spinning tip until it becomes a solid phase while it passes through the air gap and the quenching medium. In order to perform this role, the content of the non-solvent in the polymer solution may generally be in the range of 10 to 20% by weight.

Meanwhile, the polymer solution may comprise at least one additive selected from the group consisting of lithium nitrate ($LiNO_3$) and polyvinylpyrrolidone. Preferably, the polymer solution may comprise lithium nitrate. Lithium nitrate is readily dissolved in water to help form a porous support layer, as well as it can control the phase transfer rate of the polymer solution. The content of the additive in the polymer solution may range from 0.1 to 10% by weight.

In step (2), the polymer solution and a bore fluid are coextruded (i.e., spun) through a spinneret to form a polymeric hollow fiber membrane.

The bore fluid spun with the polymer solution may be a mixture of an organic solvent and a non-solvent. The organic solvent in the bore fluid may be at least one selected from the group consisting of N-methyl-2-pyrrolidone (NMP) and dimethylformamide (DMF), but it is not limited thereto. The non-solvent in the bore fluid may be water, but it is not limited thereto. The weight ratio of the organic solvent to the non-solvent in the bore fluid may be in the range of 60:40 to 90:10, but it is not particularly limited to this range.

At the time of spinning, the temperature of the polymer solution and the bore fluid and the temperature of the pump and the line are preferably maintained at 50 to 70° C., but the temperature is not particularly limited thereto.

In addition, the flow rates of the polymer solution and the bore fluid are preferably maintained at 1.5 to 3.0 ml/min and 0.5 to 1.0 ml/min, respectively, but the flow rates are not particularly limited thereto.

It is preferable to use a cylindrical tip having a diameter of 200 to 300 μm as a spinning tip for the bore fluid and that having a diameter of 1,300 to 1,500 μm as a spinning tip for the polymer solution in the spinneret, but the sizes are not particularly limited thereto.

The highly volatile solvent is evaporated while the spun polymeric yarn passes through the air gap, resulting in the formation of a dense film near the outer wall of the polymeric hollow fiber membrane. The height of the air gap may be, for example, 5 cm or more, 10 cm or more, or 20 cm or more, but the height is not particularly limited thereto. In general, a denser film can be formed near the outer wall of the polymeric hollow fiber membrane by the evaporation of the volatile solvent as the height of the air gap is increased to some extent.

In step (3), the extruded polymeric hollow fiber membrane is quenched in a quenching medium.

In such event, the quenching medium is preferably deionized water, but it is not particularly limited thereto. The temperature of the quenching medium is suitably from 25 to 50° C., but the temperature is not particularly limited thereto.

While the polymeric hollow fiber membrane passes through the quenching medium, the phase transition takes place by the exchange of the quenching medium such as water with the organic solvent, thereby obtaining a hollow fiber membrane in a solid state.

In step (4), the polymeric hollow fiber membrane is wound. For example, the polymeric hollow fiber membrane in a solid state is wound on a take-up drum. The winding speed is preferably 10 to 20 m/min, but the speed is not particularly limited thereto.

The take-up drum is partially immersed in deionized water contained in a container at room temperature. Thus, the polymeric hollow fiber membrane may be immersed in deionized water for 10 to 20 minutes while it is being wound on the take-up drum.

Subsequently, the polymeric hollow fiber membrane may be cut to an appropriate length (for example, 20 to 50 cm) and immersed in separate deionized water for about 2 to 3 days to completely remove the solvent remaining in the polymeric hollow fiber membrane. Thereafter, the polymeric hollow fiber membrane, from which the solvent has been completely removed, is subjected to solvent exchange with a non-solvent in the order of a low surface tension such as methanol and hexane to remove remaining water. It is then exposed to air for one hour to remove hexane and dried in an oven.

Hybrid Carbon Molecular Sieve Hollow Fiber Membrane

The hybrid carbon molecular sieve hollow fiber according to still another embodiment of the present invention comprises a carbonized product of a hybrid polymeric hollow fiber membrane, which comprises a glassy polymer matrix containing fluorine and a ladder-structured polysilsesquioxane.

Since the hybrid polymeric hollow fiber membrane, which is a precursor for the hybrid carbon molecular sieve hollow fiber membrane, comprises a fluorine-containing glassy polymer (specifically, a fluorine-containing polyimide), an etching gas such as fluoroform ($CHF_3$) or hydrogen fluoride (HF) may be generated at the time of pyrolysis (i.e., carbonization) of the polymeric hollow fiber membrane.

Meanwhile, the polysilsesquioxane may be homogeneously blended to the fluorine-containing glassy polymer matrix by forming a secondary bonding, including a hydrogen bond, or it may be dispersed non-homogeneously in the fluorine-containing glassy polymer without such a hydrogen bond. The "secondary bonding" as used herein refers to an intermolecular bonding. The secondary bonding includes a hydrogen bond and a Van der Waals bond and is differentiated from an interatomic primary bonding, such as an ionic bond.

When a hybrid polymeric hollow fiber membrane in which a fluorine-containing polyimide matrix and a ladder-structured polysilsesquioxane are well mixed by a secondary bonding such as a hydrogen bond is used as a precursor for a carbon molecular sieve hollow fiber membrane and when the polymeric hollow fiber membrane is pyrolyzed (i.e., carbonized), the rigid double siloxane structure of the ladder-structured polysilsesquioxane retards the relaxation of the polyimide chains to be caused by heating. Thus, it is possible to suppress the collapse of a porous support layer and to maintain a thin selective layer, thereby achieving a high flux of the hybrid carbon molecular sieve hollow fiber membrane.

The hybrid carbon molecular sieve hollow fiber membrane according to an embodiment of the present invention may comprise a selective layer having a thickness of 100 nm to 3 μm. Specifically, the thickness of the selective layer may be 200 nm to 2 μm or 300 nm to 2 μm, preferably 300 nm to 1 μm.

The hybrid carbon molecular sieve hollow fiber membrane according to an embodiment of the present invention may comprise ultramicropores having an average size of 1 Å or more and less than 7 Å. Specifically, the average size of the ultramicropores may be 4 Å or more and less than 7 Å. Alternatively, the hybrid carbon molecular sieve hollow fiber membrane may comprise ultramicropores having an average size of less than 7 Å and micropores having an average size of 7 to 20 Å. In such event, the size of the ultramicropores and that of the micropores may be measured by analyzing the carbon molecular sieve hollow fiber through low-temperature carbon dioxide ($CO_2$) adsorption on the basis of the density functional theory.

Specifically, the hybrid carbon molecular sieve hollow fiber may comprise the ultramicropores and the micropores in a volume or area ratio of 0.1:99.9 to 10.0:90.0. The hybrid carbon molecular sieve hollow fiber membrane according to an embodiment of the present invention comprises the ultramicropores acting as a molecular sieve in addition to the micropores having a high gas permeability and thus has a dual structure of the micropores and the ultramicropores. Therefore, the hybrid carbon molecular sieve hollow fiber membrane is capable of effectively separating even gases having small molecular sizes.

The hybrid carbon molecular sieve hollow fiber membrane according to an embodiment of the present invention may separate gases having a difference in the molecular size of 0.1 to 5 Å. Specifically, the difference in the molecular size of the gases that may be separated according to the present disclosure may be at least 0.1 Å, at least 0.15 Å, at least 0.2 Å, at least 0.3 Å, at least 0.4 Å, at least 0.5 Å, at least 1 Å, at least 2 Å, at least 3 Å, at least 4 Å, or 5 Å, and at most 5 Å, at most 4 Å, at most 3 Å, at most 2 Å, at most 1.5 Å, at most 1 Å, at most 0.8 Å, at most 0.6 Å, at most 0.5 Å, at most 0.4 Å, at most 0.3 Å, at most 0.2 Å, or 0.1 Å.

The hybrid carbon molecular sieve hollow fiber membrane according to an embodiment of the present invention may have an outer diameter of 100 to 300 μm and an inner diameter of 75 to 150 μm. Preferably, the hybrid carbon molecular sieve hollow fiber membrane may have an outer diameter of 150 to 250 μm and an inner diameter of 80 to 130 μm.

Preferably, the hybrid carbon molecular sieve hollow fiber membrane according to an embodiment of the present invention may be coated with poly(dimethylsiloxane) (PDMS). The hybrid carbon molecular sieve hollow fiber membrane coated with poly(dimethylsiloxane) can alleviate the physical aging phenomenon.

It is possible for the hybrid carbon molecular sieve hollow fiber membrane according to an embodiment of the present invention to separate gases selected from the group consisting of oxygen/nitrogen, carbon dioxide/carbon tetrachloride, carbon dioxide/nitrogen, nitrogen/carbon tetrachloride, propylene/propane, and ethylene/ethane. Preferably, the hybrid carbon molecular sieve hollow fiber membrane can be effectively used to separate propylene/propane from each other.

Process for Preparing a Hybrid Carbon Molecular Sieve Hollow Fiber Membrane

The process for preparing a hybrid carbon molecular sieve hollow fiber membrane according to still another embodiment of the present invention comprises (1) dissolving a glassy polymer containing fluorine and a ladder-structured polysilsesquioxane in an organic solvent to obtain a polymer solution; (2) extruding the polymer solution and a bore fluid through a spinneret to form a polymeric hollow fiber membrane; (3) quenching the extruded polymeric hollow fiber membrane in a quenching medium; (4) winding the polymeric hollow fiber membrane; and (5) pyrolyzing the polymeric hollow fiber membrane.

The above steps (1) to (4) are substantially the same as the steps (1) to (4) described in the process for preparing a hybrid polymeric hollow fiber membrane.

In step (5), the polymeric hollow fiber membrane is pyrolyzed (i.e., carbonized).

Here, the polymeric hollow fiber membrane may be dried in air at room temperature for one hour and dried at 75° C. under vacuum for 12 hours before the pyrolysis.

Figure 3:
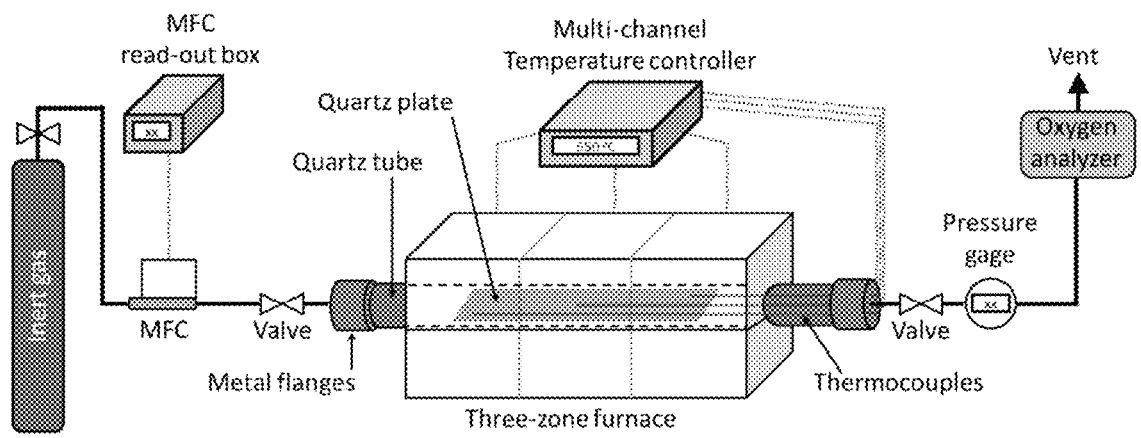
FIG. 3 is a schematic diagram of an apparatus for pyrolyzing a polymeric hollow fiber membrane.

Referring to FIG. 3, the procedure of pyrolysis (i.e., carbonization) of the polymeric hollow fiber membrane is described. The dried polymeric hollow fiber membrane is placed on a quartz plate in a quartz tube of a pyrolysis apparatus. Then, the temperature is raised to a level at which pyrolysis can be carried out while an inert gas such as argon is continuously fed thereto. Preferably, for the pyrolysis, the temperature is raised from room temperature to 250° C. at a rate of 10° C./min, from 250° C. to $T_{soaking}$ (i.e., final carbonization temperature)–15° C. at a rate of 3.85° C./min, and from $T_{soaking}$–15° C. to $T_{soaking}$ at a rate of 0.25° C./min. The temperature is then maintained for 2 hours at the carbonization temperature ($T_{soaking}$). But the pyrolysis conditions are not particularly limited thereto. The final pyrolysis temperature of the hybrid polymeric hollow fiber membrane in the present invention is suitably 500 to 800° C. It is preferable to maintain the final pyrolysis temperature for 1 to 2 hours.

In order to alleviate the physical aging phenomenon of the hybrid carbon molecular sieve hollow fiber membrane thus obtained, the process for preparing a hybrid carbon molecular sieve hollow fiber membrane according to an embodiment of the present invention may further comprise coating the hybrid carbon molecular sieve hollow fiber membrane with poly(dimethylsiloxane) (PDMS).

Specifically, a poly(dimethylsiloxane) resin and a cross-linking agent are mixed at a weight ratio of 9:1 to obtain a mixture thereof. Heptane is added to the mixture to prepare a coating precursor solution at a concentration of 90 to 99% by weight, followed by carrying out partial crosslinking by stirring it for 12 hours. The carbon molecular sieve hollow fiber membrane is immersed in this solution for 5 to 10 minutes. Thereafter, the carbon molecular sieve hollow fiber membrane is dried at room temperature for 30 to 60 minutes and dried at 100° C. under vacuum for 12 to 24 hours.

EXAMPLE

Hereinafter, the present invention will be described in more detail with reference to Examples and Comparative Examples. However, the following examples are for illustrative purposes only and are not intended to limit the scope of the present invention.

Preparation Example 1: Preparation of a Carbon Molecular Sieve Hollow Fiber Membrane 104 ml of N-methyl-2-pyrrolidone (NMP) was added to a mixture of 20 g of 4,4'-(hexafluoroisopropylidene)diphthalic anhydride (6FDA) and 4.06 g of 2,4,6-trimethyl-1,3-diaminobenzene (DAM)/3,5-diaminobenzoic acid (DABA) (molar ratio of 3:2) to prepare a monomer solution having a concentration of 20% by weight. The mixture was stirred at about 5° C. for 24 hours to obtain a high molecular weight polyamic acid solution. 4.3 g of β-picoline and 43.2 g of acetic anhydride were added to the polyamic acid solution, which was stirred at room temperature for 24 hours for imidization. The precipitated polyimide (6FDA-DAM:DABA (3:2)) was washed with methanol and dried at 180° C. under vacuum for 24 hours to obtain 24.1 g of 6FDA-DAM:DABA (3:2).

A 100-ml round bottom flask was charged with 0.04 g of potassium carbonate, 4.8 g of deionized water, and 8 g of tetrahydrofuran (THF) to obtain a clear solution. 9.52 g of phenyltrimethoxysilane and 7.27 g of 2-(2-pyridylethyl)trimethoxysilane were added dropwise thereto under nitrogen. The reaction mixture was vigorously stirred for 5 days. After evaporation of the volatile materials, the white resinous portion was dissolved in 100 ml of dichloromethane and extracted several times with water. The organic material was collected, dried over anhydrous magnesium sulfate, and filtered. Dichloromethane was evaporated to obtain 12.1 g of a white powder of LPPyr64 (yield: 88%).

6FDA-DAM:DABA (3:2) (Formula 3a) and LPPyr64 (Formula 4c) thus obtained were mixed at a weight ratio of 80:20. This polymer mixture was dissolved in a mixed organic solvent of N-methyl-2-pyrrolidone (NMP) and lithium nitrate (LiNO$_3$). Added thereto were tetrahydrofuran (THF) and ethanol. A mixture of N-methyl-2-pyrrolidone (NMP) and water was separately prepared as a bore fluid. The content of each component constituting the polymer solution is as shown in Table 1 below. In addition, the composition of the bore fluid is shown in Table 2 below.

TABLE 1

| Composition of polymer solution | Part by weight |
|---|---|
| 6FDA-DAM:DABA (3:2) | 23.0 |
| LPPyr64 | 5.75 |
| NMP | 40.25 |
| THF | 10.0 |

TABLE 1-continued

| Composition of polymer solution | Part by weight |
|---|---|
| Ethanol | 16.0 |
| LiNO$_3$ | 5.0 |
| Total | 100.0 |

TABLE 2

| Composition of bore fluid | Part by weight |
|---|---|
| NMP | 80 |
| Water | 20 |
| Total | 100.0 |

Figure 4:
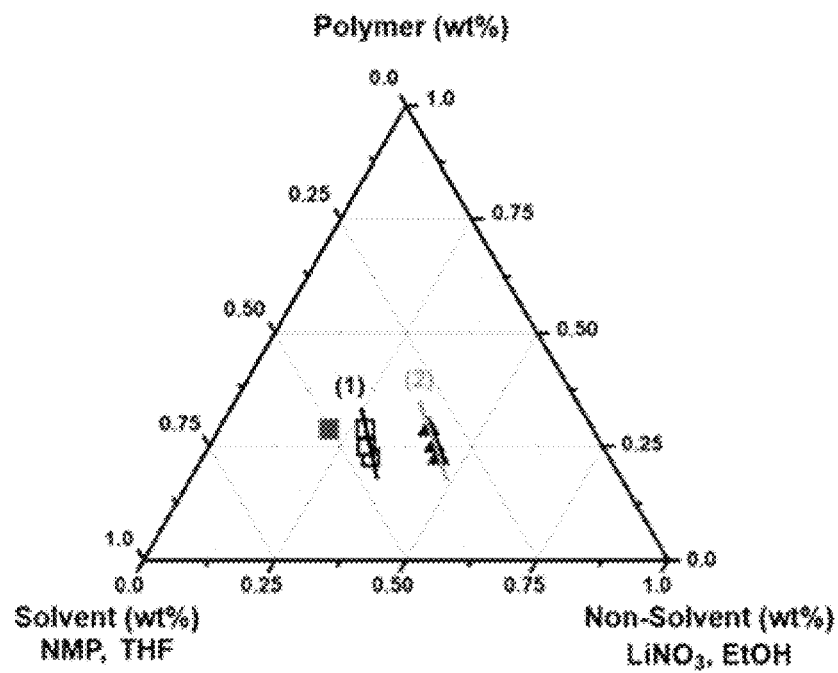
FIG. 4 is a ternary phase diagram of a hybrid polymeric hollow fiber membrane that comprises 6FDA-DAM:DABA (3:2) and LPPyr64 according to the Example of the present invention.

In the ternary diagram of FIG. 4, the open squares (1) indicate the phase boundary of the polymer mixture of 6FDA-DAM:DABA (3:2) and LPPyr64 in a ratio of 80:20; the open triangles indicate the phase boundary of 6FDA-DAM:DABA (3:2); and the solid square indicates the polymer solution for spinning the polymer mixture of 6FDA-DAM:DABA (3:2) and LPPyr64 in a ratio of 80:20 in Preparation Example 1. It can be seen from this figure that the mixture of 6FDA-DAM:DABA (3:2) and LPPyr64 is more hydrophobic than 6FDA-DAM:DABA (3:2).

The polymer solution was spun using the dry-jet/wet-quench process of FIG. 1 to prepare a hybrid polymeric hollow fiber membrane. The spinning conditions were as shown in Table 3 below. The polymeric hollow fiber membrane thus fabricated had an outer diameter and an inner diameter of 320 μm and 170 μm, respectively.

TABLE 3

| Flow rate of polymer solution (ml/min) | 1.5 |
|---|---|
| Flow rate of bore fluid (ml/min) | 0.5 |
| Air gap (cm) | 15 |
| Pump temp. (° C.) | 70 |
| Line temp. (° C.) | 70 |
| Spinneret temp. (° C.) | 70 |
| Quenching medium temp. (° C.) | 50 |
| Winding speed (m/min) | 20 |

The polymeric hollow fiber membrane was removed from the take-up drum, cut to a length of about 30 cm, and immersed in deionized water for 3 days. In such event, the deionized water was replaced every day. Thereafter, the polymeric hollow fiber membrane was washed with methanol for 30 minutes three times and with hexane three times. Then, the polymeric hollow fiber membrane was dried in air at room temperature for one hour and dried at 75° C. under vacuum for 12 hours.

The dried polymeric hollow fiber membrane was placed on a quartz plate (United Silica Products, USA) in a quartz tube (MTI, USA) of a pyrolysis apparatus. Both ends of the quartz tube were sealed with metal flanges with silicone O-rings. To control the inside temperature of the quartz tube accurately and uniformly, a three-zone furnace (Thermcraft, USA) was used. The temperature was raised to a level at which pyrolysis could be carried out while argon was continuously fed into the quartz tube at a rate of 400 cm$^3$/min. In such event, the temperature and the temperature elevation rate were as shown in Table 4 below. The carbon molecular sieve hollow fiber membrane thus fabricated had an outer diameter and an inner diameter of 220 μm and 115 μm, respectively.

TABLE 4

| Initial temp. (° C.) | Final temp. (° C.) | Temp. elevation rate (° C./min) |
|---|---|---|
| 50 | 250 | 13.3 |
| 250 | 650 | 3.85 |
| 660 | 660 | 0.25 |
| 675 | 675 | Maintained for 2 hours |

Preparation Example 2: Preparation of a Flat Carbon Molecular Sieve Membrane 5 g of a polymer mixture of 6FDA-DAM:DABA (3:2) and LPPyr64 in a weight ratio of 80:20 as used in Production Example 1 was completely dissolved in 95 g of tetrahydrofuran (THF). Then, a film was formed by a melting and casting process on a Teflon dish with a Teflon casting ring. To allow gradual evaporation of the solvent, the melting and casting process was carried out in a glove bag saturated with THF. After 12 hours, the vitrified film was dried at 120° C. under vacuum for 12 hours to remove the residual solvent. The dried film was cut into a circular shape, when a sharp die cutter was smashed with a hammer to reduce cutting stress. The film thus obtained had a uniform thickness of 80±10 μm. The film thus obtained was washed, dried, and pyrolyzed in the same manner as in Preparation Example 1 to obtain a flat carbon molecular sieve membrane.

Preparation Example 3: Preparation of a Carbon Molecular Sieve Hollow Fiber Membrane Coated with PDMS The carbon molecular sieve hollow fiber membrane obtained in Preparation Example 1 was coated with poly (dimethylsiloxane) (PDMS). A poly(dimethylsiloxane) resin (Sylgard 184A, Dow Corning) and a crosslinking agent (Sylgard 184B, Dow Corning) were mixed at a weight ratio of 9:1 to obtain a mixture thereof. Heptane was added to the mixture to prepare a coating precursor solution having a concentration of 99% by weight, followed by conducting partial crosslinking by stirring it for 12 hours. The carbon molecular sieve hollow fiber membrane was immersed in this solution for 10 minutes. Thereafter, the carbon molecular sieve hollow fiber membrane was dried at room temperature for 30 minutes and dried at 100° C. under vacuum for 12 hours.

Figure 5:
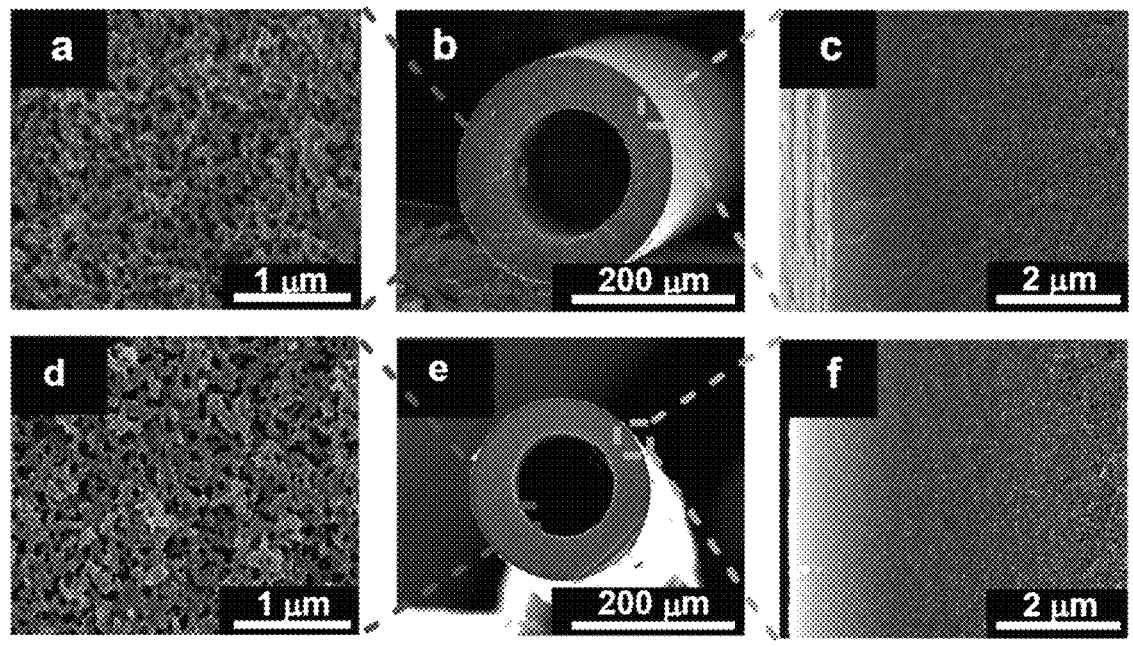
FIG. 5 shows the cross-sectional scanning electron microscopy (SEM) images of a hybrid polymeric hollow fiber membrane that comprises 6FDA-DAM:DABA (3:2) and LPPyr64 (a to c) and a hybrid carbon molecular sieve hollow fiber membrane prepared therefrom (d to f) according to the Example of the present invention.

Test Example 1: Pore Structure of a Polymeric Hollow Fiber Membrane and a Carbon Molecular Sieve Hollow Fiber Membrane FIG. 5 shows the cross-sectional scanning electron microscopy (SEM) images of the hybrid polymeric hollow fiber membrane prepared in Preparation Example 1 and the hybrid carbon molecular sieve hollow fiber membrane prepared therefrom.

Both of the hybrid polymeric hollow fiber membrane and the hybrid carbon molecular sieve hollow fiber membrane were confirmed to have a well-developed open pore structure (see FIGS. 5(a) and 5(d)). The inner diameter and the outer diameter of the carbon molecular sieve hollow fiber membranes were reduced approximately by 23% and 31%, respectively, as compared with the inner diameter and the outer diameter of the polymeric hollow fiber membrane as a precursor therefor. In addition, the carbon molecular sieve hollow fiber membrane had a selective layer having a thickness of about 2.7 μm (FIG. 5(f)).

It was confirmed from the above that when the fluorine-containing glassy polymer was pyrolyzed, the ladder-structured polysilsesquioxane having a rigid double siloxane structure retarded the conversion of the fluorine-containing glassy polymer chains to a rubbery polymer, resulting in a carbon molecular sieve hollow fiber membrane having a thin and dense selective layer in which the morphology of the porous support layer was maintained.

Test Example 2: Gas Permeability and Selectivity of a Polymeric Hollow Fiber Membrane The hybrid polymeric hollow fiber membrane prepared in Preparation Example 1 according to an embodiment of the present invention and the flat polymeric membrane prepared in Preparation Example 2 were evaluated for the gas separation performance by using various single gases (for example, $CO_2$, $O_2$, $N_2$, $CH_4$, $C_3H_6$, and $C_3H_8$) and for the selectivity of $O_2/N_2$, $CO_2/CH_4$ and $C_3H_6/C_3H_8$ at 1 atm and 35° C. The results are shown in Table 5. In Table 5, the single gas flux of the polymeric hollow fiber membrane is in GPU unit, and the permeability of the flat polymeric membrane is in Barrer unit.

TABLE 5

| | $CO_2$ | $O_2$ | $N_2$ | $CH_4$ | $C_3H_6$ | $C_3H_8$ | $O_2/N_2$ | $CO_2/N_2$ | $CO_2/CH_4$ | $C_3H_6/C_3H_8$ |
|---|---|---|---|---|---|---|---|---|---|---|
| Polymeric hollow fiber membrane | 148.04 | 36.68 | 5.64 | 4.43 | 3.26 | 0.25 | 6.5 | 26.3 | 33.4 | 13.0 |
| Flat polymeric membrane | 97.32 | — | 3.11 | 2.13 | 2.13 | 0.18 | — | 23.4 | 30.1 | 11.8 |

As the selectivity of the hybrid polymeric hollow fiber membrane of Preparation Example 1 was similar to that of the flat polymeric membrane of Preparation Example 2, it was confirmed that a defectless polymeric hollow fiber membrane was fabricated.

Test Example 3: Antiaging Performance of a Polymeric Hollow Fiber Membrane

Meanwhile, the gas separation performance of the hybrid polymeric hollow fiber membrane obtained in Preparation Example 1 according to an embodiment of the present invention was evaluated for 60 days under the same conditions as in Test Example 2. The results are shown in Table 6.

TABLE 6

| | Permeability of $CO_2$ (GPU) | Selectivity of $CO_2/CH_4$ |
|---|---|---|
| Polymeric hollow fiber membrane (day 0) | 148.04 | 33.4 |
| Polymeric hollow fiber membrane (day 60) | 135.81 | 34.1 |

In the hybrid polymeric hollow fiber membrane according to an embodiment of the present invention, it was confirmed that the physical aging of the polymeric hollow fiber membrane was suppressed by the ladder-structured polysilsesquioxane having a rigid double siloxane structure, thereby maintaining the excellent gas permeability of carbon dioxide even after 60 days of fabrication.

Test Example 4: Gas Permeability and Selectivity of a Polymeric Hollow Fiber Membrane and a Carbon Molecular Sieve Hollow Fiber Membrane The hybrid polymeric hollow fiber membrane prepared in Preparation Example 1 according to an embodiment of the present invention and the hybrid carbon molecular sieve hollow fiber membrane prepared therefrom were evaluated for the permeability of carbon dioxide ($CO_2$) and for the selectivity of $CO_2/CH_4$ under the same conditions as in Test Example 2. The results are shown in Table 7.

TABLE 7

| | Permeability of $CO_2$ (GPU) | Selectivity of $CO_2/CH_4$ |
|---|---|---|
| Polymeric hollow fiber membrane | 148.04 | 33.4 |
| Carbon molecular sieve hollow fiber membrane | 956 | 50.2 |

The permeability of $CO_2$ and the selectivity of $CO_2/CH_4$ of the carbon molecular sieve hollow fiber membrane were increased approximately by 546% and 50%, respectively, as compared with those of the polymeric hollow fiber membrane. This is understood to be attributable to the presence of a thin selective layer formed near the surface of the carbon molecular sieve hollow fiber membrane.

Figure 6:
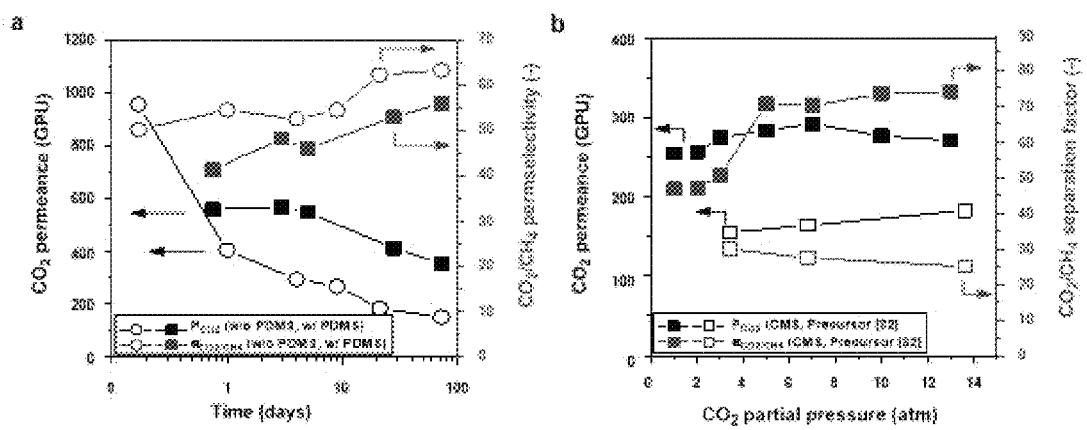
FIG. 6 shows graphs that illustrate the gas separation performance of a hybrid carbon molecular sieve hollow fiber membrane prepared from a hybrid carbon molecular sieve hollow fiber membrane that comprises 6FDA-DAM:DABA (3:2) and LPPyr64 and that of the hybrid carbon molecular sieve hollow fiber membrane coated with poly(dimethylsiloxane).

Test Example 5: Coating Effect of a Carbon Molecular Sieve Hollow Fiber Membrane The hybrid carbon molecular sieve hollow fiber membrane prepared in Preparation Example 1 and that coated with poly(dimethylsiloxane) (PDMS) as prepared in Preparation Example 3 were evaluated for the permeability of carbon dioxide ($CO_2$) and for the selectivity of $CO_2/CH_4$ for 72 days at 1 atm and 35° C. The results are shown in FIG. 6.

The physical aging phenomenon over time was suppressed in the case of the hybrid carbon molecular sieve hollow fiber membrane coated with PDMS (see FIG. 6(a)). In addition, as a result of evaluating the gas permeability of the hybrid carbon molecular sieve hollow fiber membrane for a mixed gas of $CO_2/CH_4$ at a weight ratio of 50:50, the selectivity of $CO_2/CH_4$ was not decreased despite the increase in the partial pressure of $CO_2$. According to this, it had resistance to plasticization up to a partial pressure of $CO_2$ of 13 atm (see FIG. 6(b)).

The hybrid polymeric hollow fiber membrane and the hybrid carbon molecular sieve hollow fiber membrane according to the embodiments of the present invention are excellent in gas permeability and selectivity and can have a large surface area per unit volume. Thus, they can be advantageously used for separating gases with a high energy efficiency on a large scale.

What is claimed is:

1. A hybrid polymeric hollow fiber membrane, comprising:
a glassy polymer matrix comprising fluorine; and
a ladder-structured polysilsesquioxane,
wherein a phase separation exists on a surface of the hybrid polymeric hollow fiber membrane, suitable to form a selective layer having a thickness in a range of from 100 nm to 3 μm upon pyrolysis of the hybrid polymeric hollow fiber membrane.

2. The hybrid polymeric hollow fiber membrane of claim 1, wherein the fluorine-comprising glassy polymer of the matrix is a fluorine-comprising polyimide, comprising in polycondensed form, an aromatic carboxylic dianhydride and an aromatic diamine.

3. The hybrid polymeric hollow fiber membrane of claim 2, wherein the aromatic carboxyli c dianhydride is 4,4'-(hexafluoroisopropylidene)diphthalic anhydride (6FDA) of formula (1):

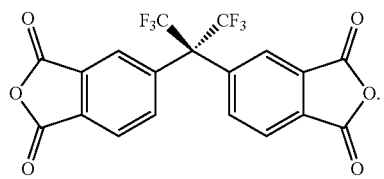

(1)

4. The hybrid polymeric hollow fiber membrane of claim 2, wherein the aromatic diamine is 2,4,6-trimethyl-1,3-diaminobenzene (DAM) of formula (2a), 3,5-diaminobenzoic acid (DABA) of formula (2b), 1,4-phenylenediamine (p-PDA) of formula (2c), 1,3-phenylenediamine (m-PDA) of formula (2d), or 2,3,5,6-tetramethyl-1,4-phenylenediamine of formula (2e):

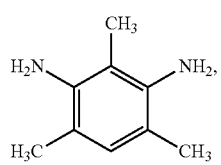

(2a)

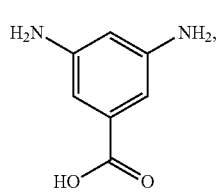

(2b)

(2c)

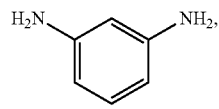

(2d)

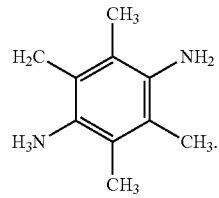

(2e)

5. The hybrid polymeric hollow fiber membrane of claim 2, wherein the fluorine-comprising polyimide is 4,4'-(hexafluoroisopropylidene)diphthalic anhydride (6FDA)-based polyimide having a repeat unit of formula (3):

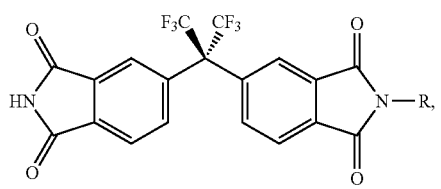

(3)

wherein R is a $C_{1-20}$ aliphatic alkyl an alicyclic alkyl comprising a monocyclic ring, a bicyclic ring, a heterocyclic ring, a multicyclic ring, or a carbon compound comprising an aromatic ring, optionally comprising fluorine.

6. The hybrid polymeric hollow fiber membrane of claim 5, wherein the 6FDA-based polyimide is 6FDA-DAM, 6FDA-mPDA, 6FDA-DABA, 6FDA-DETDA, 6FDA:BPDA-DAM (1:1), 6FDA-1,5-ND:ODA (1:1), 6FDA-DETDA:DABA (3:2), 6FDA-mPDA:DAM (3:2), 6FDA-DAM:DABA (3:2), and 6FDA-mPDA:DABA (3:2), ratios in parentheses standing for molar ratio of the components for each polymer.

7. The hybrid polymeric hollow fiber membrane of claim 6, wherein the 6FDA-based polyimide is 6FDA-DAM:DABA (3:2) of formula (3a):

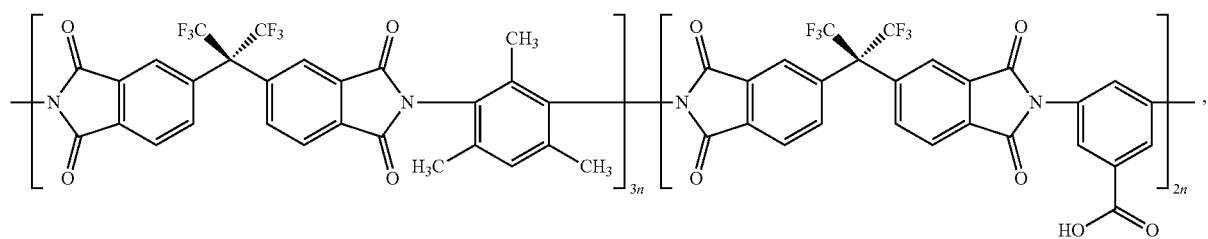
(4)

wherein n is an integer in a range of from $10^2$ to $10^4$.

8. The hybrid polymeric hollow fiber membrane of claim 1, wherein the ladder-structured polysilsesquioxane is of formula (4):

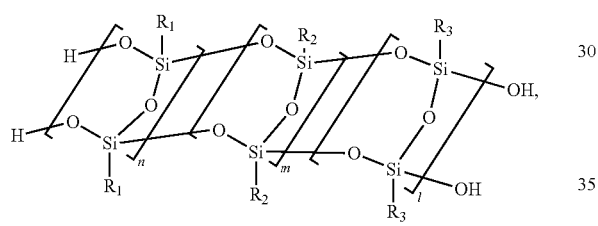
(4)

wherein $R_1$, $R_2$, and $R_3$ are independently an aromatic phenyl, heteroaromatic phenyl, aliphatic alkyl, cycloaliphatic alkyl, vinyl, aryl, methacrylate, acrylate, or epoxy, and n, m, and l are independently an integer in a range of from 0 to 100.

9. The hybrid polymeric hollow fiber membrane of claim 8, wherein the ladder-structured polysilsesquioxane comprises a poly(phenyl-co-methacryloxypropyl)silsesquioxane, poly(phenyl-co-glycidoxypropyl)silsesquioxane, poly(phenyl -co-pyridylethyl)silsesquioxane, poly(cyclohexyl-co-pyridylethyl)silsesquioxane, and/or poly(cyclohexyl-co-phenyl-co-pyridylethyl)silsesquioxane.

10. The hybrid polymeric hollow fiber membrane of claim 9, wherein the ladder-structured polysilsesquioxane is a poly(phenyl-co-methacryloxypropyl)silsesquioxane (LPMA64) of formula (4a), poly(phenyl-co-glycidoxypropyl)silsesquioxane (LPG64) of formula (4b), poly(phenyl-co-pyridylethyl)silsesquioxane (LPPyr64) of formula (4c), poly(cyclohexyl-co-pyridylethyl)silsesquioxane (LCPyr64) of formula (4d), poly(cyclohexyl -co-phenyl-co-pyridylethyl)silsesquioxane (LCPPyr334) of formula (4e):

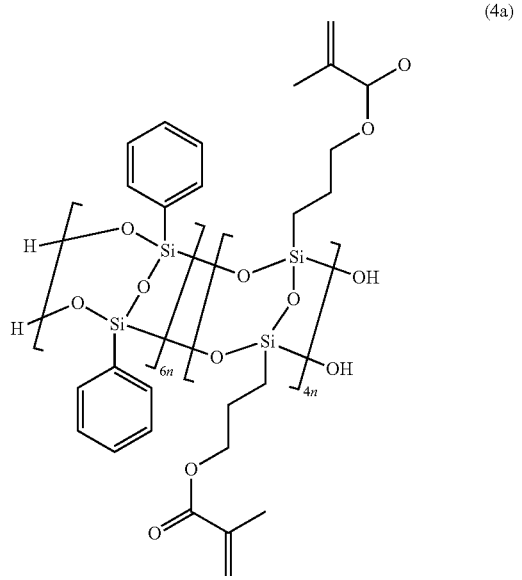
(4a)

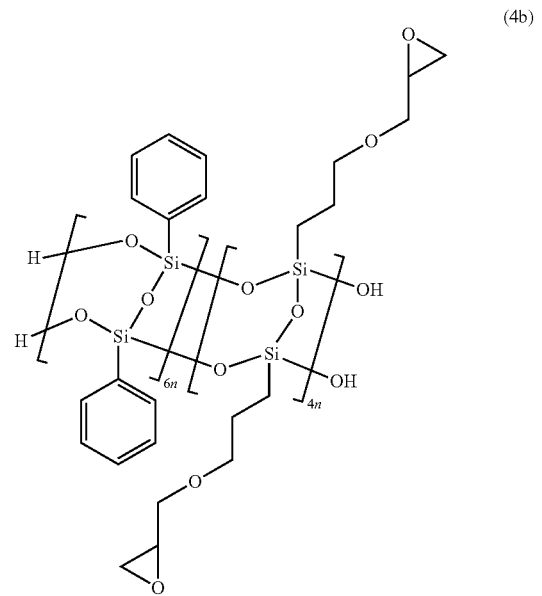
(4b)

-continued (4c)
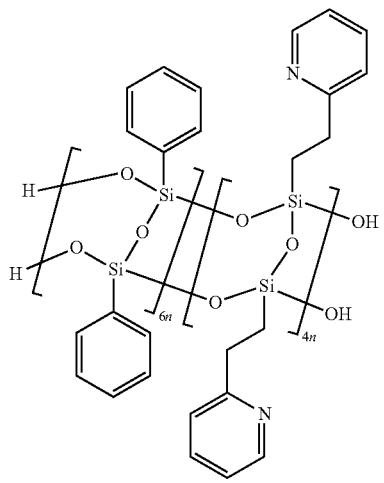

(4d)
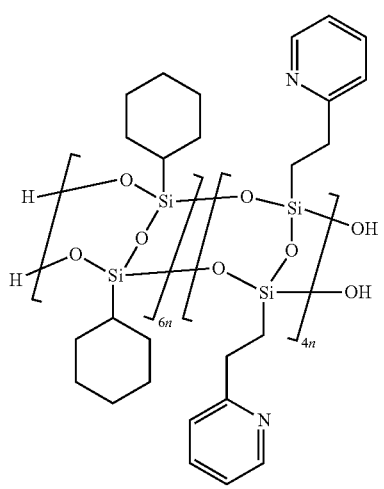

(4e)
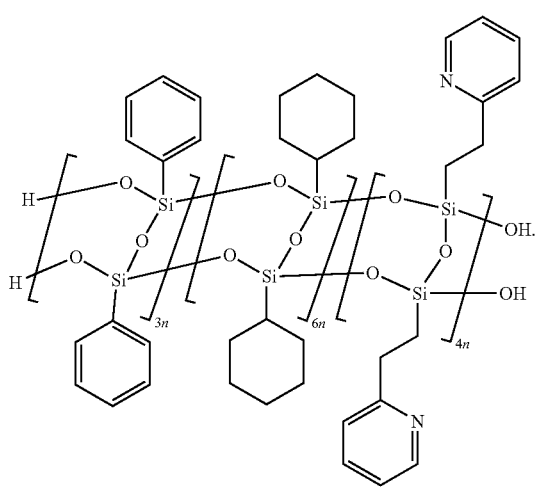

11. The hybrid polymeric hollow fiber membrane of claim 1, comprising the fluorine-containing glassy polymer and the ladder-structured polysilsesquioxane at a weight ratio in a range of from 0.1:99.9 to 99.9:0.1.

12. A process for preparing a hybrid polymeric hollow fiber membrane, comprising:

(1) dissolving a glassy polymer comprising fluorine and a ladder-structured polysilsesquioxane in an organic solvent to obtain a polymer solution;

(2) extruding the polymer solution and a bore fluid through a spinneret to form a polymeric hollow fiber membrane;

(3) quenching the extruded polymeric hollow fiber membrane in a quenching medium to obtain a phase separation on a surface of the polymeric hollow fiber membrane sufficient to provide a selective layer having a thickness in a range of from 100 nm to 3 µm on a surface of the polymeric hollow fiber membrane; and (4) winding the polymeric hollow fiber membrane.

13. The process of claim 12, wherein the organic solvent in the dissolving (1) comprises is N methyl-2-pyrrolidone, dimethylformamide, tetrahydrofuran, methylene chloride, and/or dimethyl sulfoxide.

14. The process of claim 12, wherein the bore fluid in the extruding (2) is a mixture of N-methyl-2-pyrrolidone (NMP) and water.

15. The process of claim 12, wherein the quenching medium in the quenching (3) is deionized water.

16. A hybrid carbon molecular sieve hollow fiber membrane, comprising:

a carbonized product of a hybrid polymeric hollow fiber membrane comprising a glassy polymer matrix containing fluorine and a ladder-structured polysilsesquioxane; and a selective layer having a thickness in a range of from 100 nm to 3 µm on a surface of the carbonized product.

17. The hybrid carbon molecular sieve hollow fiber membrane of claim 16, comprising a selective layer having a thickness in a range of from 200 nm to 2 µm.

18. The hybrid carbon molecular sieve hollow fiber membrane of claim 16, comprising:

ultramicropores having an average size in a range of from 1 Å to less than 7 Å; and micropores having an average size in a range of from 7 to 20 Å.

19. The hybrid carbon molecular sieve hollow fiber membrane of claim 18, comprising the ultramicropores and the micropores in a volume or area ratio in a range of from 0.1:99.9 to 10.0:90.0.

20. The hybrid carbon molecular sieve hollow fiber membrane of claim 16, which is coated with poly(dimethylsiloxane).

21. A process for preparing a hybrid carbon molecular sieve hollow fiber membrane, comprising:

(1) dissolving a glassy polymer comprising fluorine and a ladder-structured polysilsesquioxane in an organic solvent to obtain a polymer solution;

(2) extruding the polymer solution and a bore fluid through a spinneret to form a polymeric hollow fiber membrane;

(3) quenching the extruded polymeric hollow fiber membrane in a quenching medium;

(4) winding the polymeric hollow fiber membrane; and (5) pyrolyzing the polymeric hollow fiber membrane in an inert gas to obtain the hybrid carbon molecular sieve hollow fiber membrane comprising a selective layer having a thickness in a range of from 100 nm to 3 µm on a surface of the hybrid carbon molecular sieve hollow fiber membrane.

22. The process of claim 21, wherein the pyrolysis temperature in the pyrolyzing (5) is in a range of from 500 to 800° C.

23. The process of claim 21, further comprising:
coating the hybrid carbon molecular sieve hollow fiber membrane with poly(dimethylsiloxane).

* * * * *